(12) United States Patent
Lewitus et al.

(10) Patent No.: US 7,698,899 B2
(45) Date of Patent: Apr. 20, 2010

(54) APPARATUS, SYSTEM AND METHOD FOR BEVERAGE FORMING

(75) Inventors: Victor Lewitus, Jerusalem (IL); Shimon Mazor, Beer Sheva (IL); Gabriel Bachan, Arad (IL)

(73) Assignee: Freeze Solutions Ltd., Jerusalem (IL)

( * ) Notice: Subject to any disclaimer, the term of this patent is extended or adjusted under 35 U.S.C. 154(b) by 348 days.

(21) Appl. No.: 11/662,336

(22) PCT Filed: Sep. 9, 2004

(86) PCT No.: PCT/IL2004/000818

§ 371 (c)(1),
(2), (4) Date: Dec. 5, 2007

(87) PCT Pub. No.: WO2006/027764

PCT Pub. Date: Mar. 16, 2006

(65) Prior Publication Data

US 2008/0099502 A1  May 1, 2008

Related U.S. Application Data

(60) Provisional application No. 60/501,348, filed on Sep. 8, 2003.

(51) Int. Cl.
*A23G 9/16* (2006.01)

(52) U.S. Cl. .................. 62/69; 62/342; 165/63

(58) Field of Classification Search ........... 62/342–343, 62/68; 165/61–63
See application file for complete search history.

(56) References Cited

U.S. PATENT DOCUMENTS

| 3,400,551 A * | 9/1968 | Booth et al. ............ 62/135 |
| 6,513,578 B2 * | 2/2003 | Frank .................... 165/63 |

* cited by examiner

*Primary Examiner*—William E Tapolcai
(74) *Attorney, Agent, or Firm*—Eitan Mehulal Law Group

(57) ABSTRACT

A beverage forming apparatus, system and cooling method is disclosed. The beverage forming apparatus includes a container to contain a beverage, a detaching device to scrape frozen particles of the beverage from an inner surface of the container, a cooling medium to cool the beverage to a predetermined temperature, and a motor to provide a relative motion between the container and detaching device. The beverage forming and dispensing system includes an inlet hose to dispense a beverage into the system, a beverage forming apparatus to form the beverage with frozen microscopic particles of the beverage, a tap to dispense the beverage with the frozen microscopic particles of the beverage to a container, and a defrost apparatus to defrost the frozen microscopic particles of the beverage. The cooling method includes providing a beverage into a container, cooling the beverage to substantially a freezing temperature, detaching microscopic particles of frozen beverage from an inner surface of the container, mixing the microscopic particles of frozen beverage with the beverage, and dispensing the beverage with the microscopic particles.

22 Claims, 4 Drawing Sheets

APPARATUS, SYSTEM AND METHOD FOR BEVERAGE FORMING

CROSS-REFERENCE TO RELATED APPLICATIONS

The present application claims priority from U.S. provisional patent application Ser. No. 60/501,348, filed Sep. 8, 2003, titled "Form of chilled and constant concentration beverage".

FIELD OF THE INVENTION

The present invention relates in general to beverage forming systems. More particularly, the present invention relates to beverage forming systems for chilled beverages with constant concentration.

BACKGROUND OF THE INVENTION

Existing beverages commonly found in private and public places are typically chilled in refrigerators, or dispensers or chilled by adding water ice cubes. A variety of cold beverage dispensing systems have been designed to produce chilled beverages, such as frozen or slush beverages, chilled juice drinks, chilled alcoholic mixtures, milkshakes, fruit juices, nectars, etc.

Existing cold beverage systems do not adequately address the difficulty of continuously dispensing quality chilled beverages and maintaining the cold beverage in the required low temperature until the beverage is consumed. The degree of freezing and texture of a chilled beverage is important in providing a quality beverage. Similarly, the consistency of the freezing and texture is very important to customers in ordering drinks. If water ice cubes or crushed ice are added to the beverage to maintain its low temperature, the concentration of the beverage is diluted, and therefore, its quality is typically damaged.

In case of bottled beverages, the dilution of the original beverage typically begins substantially immediately when the ice is melting. In case of beverage dispensers, where water and syrup beverages are mixed before cooling and pouring, the beverage dispenser is typically programmed in such a way that during pouring the serving of the drink the concentration of the syrup in the beverage is bigger, and the beverage is typically diluted with the time passing because the water ice melting.

In addition, water ice cubes or crushed ice typically take the place of the beverage in the beverage container, and therefore the consumer does not receive the full capacity of the container in the beverage. Ice cube manufacturers recommend 50% of volume of cup filled with ice.

SUMMARY OF THE INVENTION

There is provided in accordance with embodiments of the present invention a beverage forming apparatus comprising a container to contain a beverage, a cooling medium to cool said beverage to a predetermined temperature, a detaching device to scrape frozen particles of said beverage from an inner surface of said container, and a motor to provide relative motion between said container and detaching device.

There is further provided in accordance with embodiments of the present invention a cooling method comprising providing a beverage into a container, cooling said beverage to substantially a freezing temperature of said beverage, detaching microscopic particles of frozen beverage from an inner surface of said container, mixing said microscopic particles of frozen beverage with said beverage, and dispensing said beverage with said microscopic particles.

There is further provided in accordance with embodiments of the present invention a beverage forming and dispensing system comprising an inlet hose to dispense a beverage into said system, a beverage forming apparatus to form said beverage with frozen microscopic particles of said beverage, a tap to dispense said beverage with said frozen microscopic particles of said beverage to a container, and a defrost apparatus to defrost said frozen microscopic particles of said beverage.

BRIEF DESCRIPTION OF THE DRAWINGS

The present invention will be understood and appreciated more fully from the following detailed description taken in conjunction with the appended drawings in which.

Figure 1:
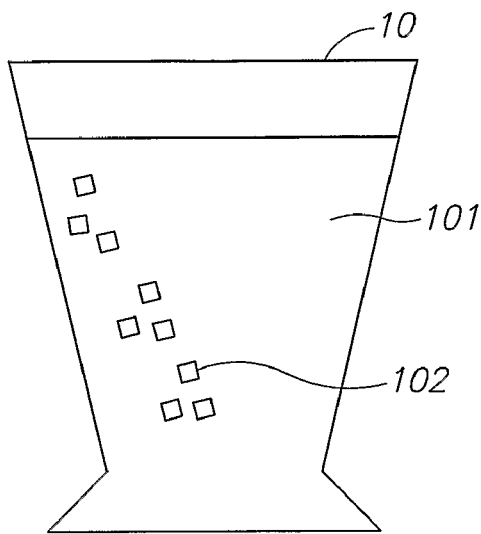
FIG. 1 is a diagram of a container 10 filled with a chilled beverage 101 in accordance with some embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION OF THE PRESENT INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Reference is now made to FIG. 1, which is a diagram of a container 10 filled with a chilled beverage 101 in accordance with some embodiments of the present invention. It should be further noted that the term "beverage" as used hereinafter includes a food liquid meant for human consumption in which the solvent is water. Chilled beverage 101 may be, for example, formulated as a non-carbonated or carbonated drinks. The following are non-limiting examples of beverage: beer, wine, liquor, liqueurs or any other consumable alcoholic liquids, including those mixed with non-alcoholic liquids; soft drinks; juices and juice-based drinks; milk and milk-based drinks; flavored and non-flavored waters; frozen drinks (including in the form of ice, crushed ice, slush, smoothy, or shake); coffees; teas; and wellness drinks, including nutriceuticals, energy drinks, or isotonic drinks.

Chilled beverage 101 may include frozen microscopic particles 102 made from the same composition of beverage 101, and therefore, the concentration of the beverage may remain substantially constant if desired. It should be noted that the term "constant concentration" as used hereinafter refers to a relatively fixed amount of material, e.g., syrup, powder, active ingredient or any other soluble substance dissolved in a unit of solution or mixture.

Frozen microscopic particles 102 may be configured as a core of microscopic ice crystal surrounded by a soluble substance, e.g., syrup, utilizing substantially the same concentration of the beverage itself. The range of the size of the frozen microscopic particles 102 may vary, and preferably the size may be determined to be not more than 30 microns. The size and the configuration of frozen microscopic particles 102 may ensure that they do not stick together and may not hamper or influence the drinking process. It should be noted that the frozen microscopic particles 102 may be passed easily through a straw due to their small size. Additionally, the relatively low weight of the frozen microscopic particles 102 may cause them to float to the surface of container 10, creating an appealing airy type cloud at the top of the container 10.

In accordance with some embodiments of the present invention, the temperature of the chilled beverage 101 may be, for example, 40° C., at the time that the beverage is poured, and the temperature of the microscopic particles 102 may be, for example, −20° C. As a result, the temperature of the chilled beverage 101 may remain low until all microscopic particles 102 are melted, without changing the concentration of the beverage.

Figure 2:
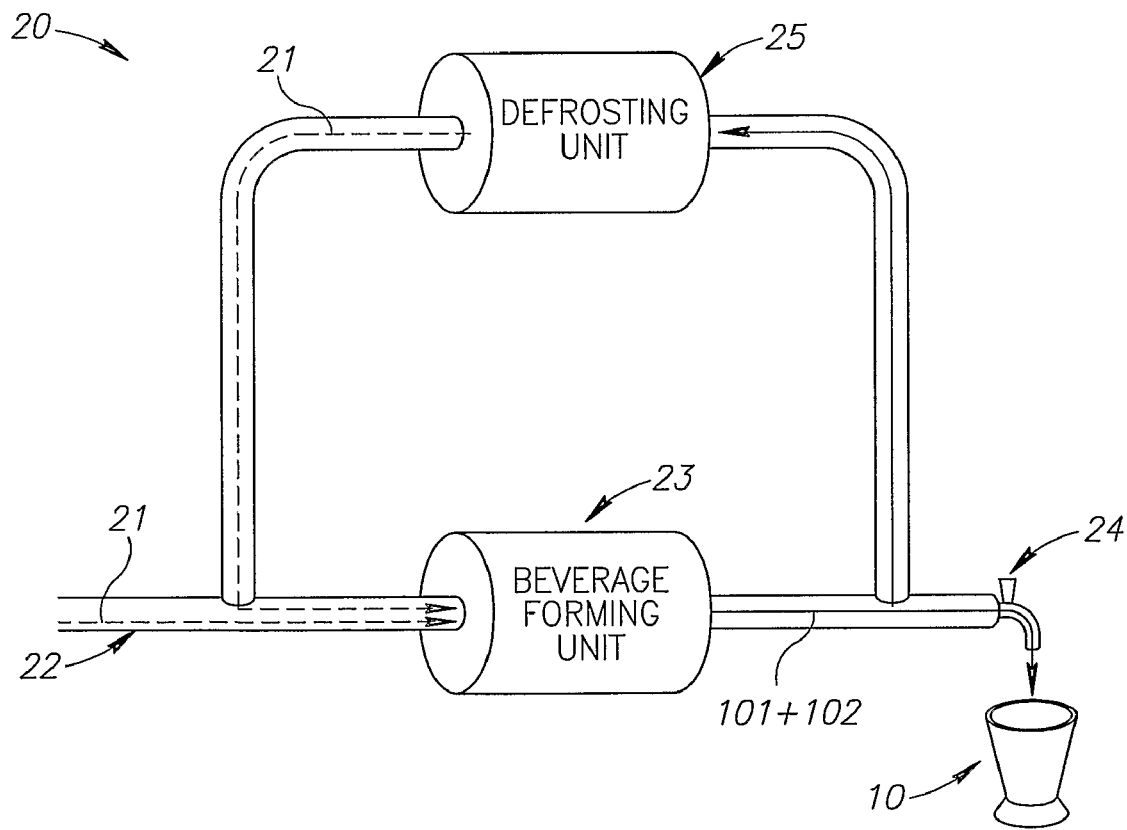
FIG. 2 is a schematic diagram of a system 20 for continuous cooling and dispensing beverage in accordance with some embodiments of the present invention.

Reference is now made to FIG. 2 which is a schematic diagram of a system 20 for continuous cooling and dispensing beverage in accordance with some embodiments of the present invention. Beverage 21 may be dispensed into system 20 through an inlet hose 22. The temperature of beverage 21 does not effect the operation of system 20 and it may be relatively hot, e.g., above 20° C., or relatively cold, e.g., below 8° C. Beverage 21 is inserted to a beverage forming unit 23 that may cool and form beverage 21 to a predetermined temperature and texture as will be described in details below. Beverage 21 may be cooled in beverage unit 23 by, for example, a cold gas. Beverage 101 with frozen microscopic particles 102 may be dispensed through a tap 24 to a container 10. When tap 24 is closed, the beverage 101 with the frozen microscopic particles 102 may be directed or routed to a defrosting unit 25 that may defrost the frozen microscopic particles 102 in order to restore the beverage to its original texture. Beverage 101 with the frozen microscopic particles 102 may be defrosted by, for example, the gas that may have been used to cool the beverage in the beverage unit 23. Beverage 21, after the defrost process, may then be directed to beverage forming unit 23. It may be understood that as long as tap 24 is closed, since the beverage may be directed from the beverage forming unit 23 to the defrosting unit 25 in a circular continuous motion, substantially at any point, beverage 101 with frozen microscopic particles may be dispensed through tap 24 to a container 10 for serving and consumption.

Figure 3:
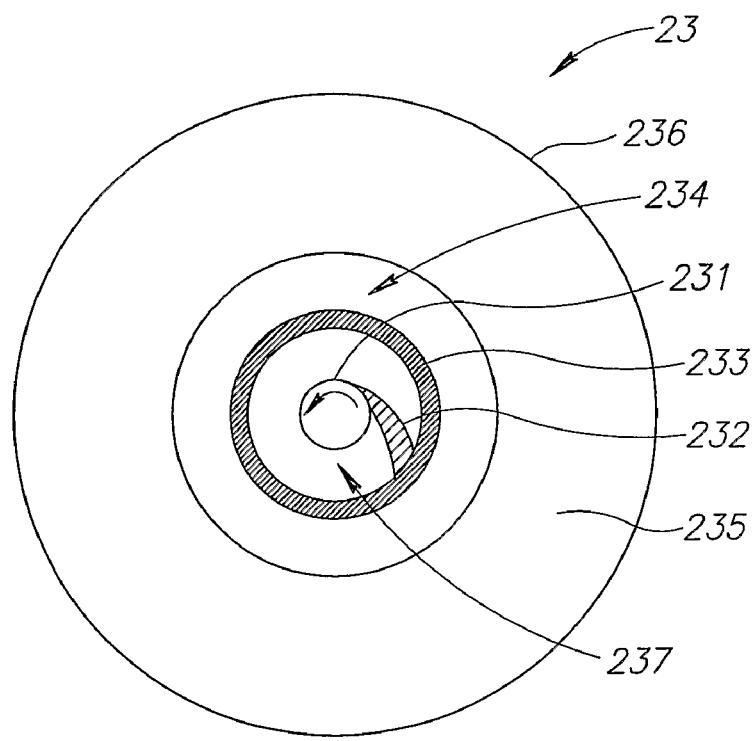
FIG. 3 is a simplified top view block diagram illustration of a beverage forming unit 22 for cooling beverage 101 and forming frozen microscopic particles 102, in accordance with some embodiments of the present invention.

Reference is now made to FIG. 3, which is a simplified top view block diagram illustration of an exemplary beverage forming unit 23 for cooling beverage 101 and forming frozen microscopic particles 102, in accordance with some embodiments of the present invention. Beverage forming unit 23 may include a shaft 231 which may be positioned within the center of heat transfer tube or container 233. The diameter and depth of shaft 231 and heat transfer tube 233 may determine the volume 237 of the beverage that may be cooled and formed by beverage forming unit 23. At least one blade 232 may be connected to the shaft 231 in such a way that blade 232 may scrape the surface of the heat transfer tube 233. Heat transfer tube 233 may be placed within a cooling medium 234 that may cool the beverage in heat transfer tube 233. Beverage forming unit 23 may also include an insulator 235 and a cover 236 which may be made, for example, of stainless steel. Beverage cooling unit 23 may also include a motor (not shown) to provide a relative motion between heat transfer tube 233 and blade 232.

Beverage 101 may be entered to the heat transfer tube 233 and it may be cooled, for example, to −1° C., or to any other freezing temperature of beverage 101. Blade 232 may scrape the frozen microscopic particles 102 formed on the surface of heat transfer tube 233 and mixed to the beverage 101 in a fixed ratio.

The size of the frozen microscopic particles 102 and the rate of their growth may be determined by several conditions such as, for example, the rotation speed of blade 232, the temperature of beverage 101, the temperature of cooling medium 234, the quality and level of polish of the inner surface of heat transfer tube 233, the volume of heat transfer tube 233 etc. In accordance with some embodiments of the present invention, the size of the frozen microscopic particles 102 may be determined to be not more than 30 microns. It should be noted that frozen microscopic particles 102, because of their small size, may not be grasped or felt by the human tongue or other parts of the mouth. In addition, frozen microscopic particles 102 may not stay in the container 10 as sediment when the beverage is consumed.

In accordance with some embodiments of the present invention the volume of the frozen microscopic particles 102 relative to the liquid particles, for example, may be determined to a fixed percentage of the total amount of the beverage, or it may be set to reach a volume that maintains the beverage in a predetermined temperature. For example, in a fixed percentage mode, the system may be configured to contain at least 10% of microscopic particles. Alternatively, in another example, it may be set to contain microscopic particles to maintain the beverage at 4° C. for 20 minutes, when the temperature outside the heat transfer tube 233 is 20° C.

Figure 4:
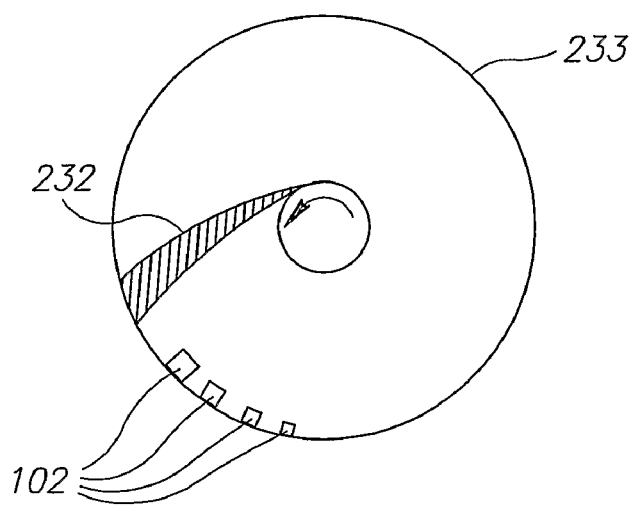
FIG. 4 is a simplified top view block diagram illustration of the formulation of microscopic particles 102 on the surface of the heat transfer tube 233.

Reference is now made to FIG. 4 which is a simplified top view block diagram illustration of the formulation of microscopic particles 102 on the surface of the heat transfer tube 233. Components of FIG. 4 that are similar to that of FIG. 3 are designated with the same reference labels, and for the sake of brevity the description is not repeated. Blade 232 may scrape the frozen microscopic particles 102 from the surface of the heat transfer tube 233 when the frozen microscopic particles 102 reach a maximal predetermined size. Substantially immediately after blade 232 scrapes the surface of the heat transfer tube 233, a new cycle of growth of frozen microscopic particles of the beverage may begin.

Figure 5:
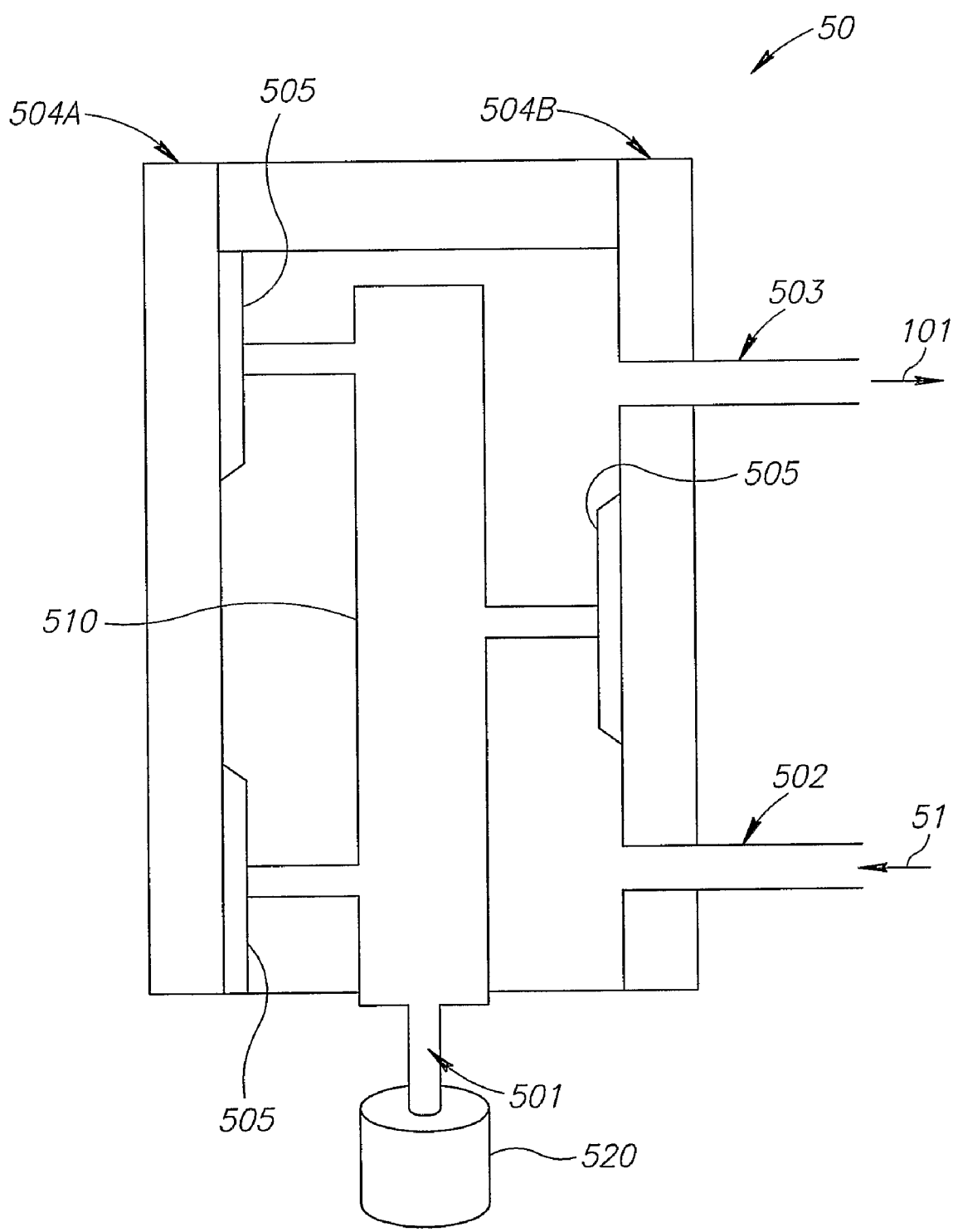
FIG. 5 is a simplified side view block diagram illustration of a system 50 for continuous cooling and dispensing beverage 101 according to some alternative embodiments of the present invention.

Reference is now made to FIG. 5 which is a simplified side view block diagram illustration of a system 50 for continuous cooling and dispensing beverage 101 according to some alternative embodiments of the present invention. System 50 may include a cooling chamber 501 with an inlet hose 502 and an outlet hose 503. Cooling chamber 501 may cool the beverage within system 50 by, for example, passing cold liquid or gas between the two sides, 504A and 504B, of the cooling chamber 501. In accordance with some embodiments of the present invention, a cold gas may be introduced at the first side 504A of the cooling chamber 501. The cold gas may then be evaporated to cool the beverage 51 and in the second side 504B the gas may be evaporated to defrost the beverage in the defrost unit as was described in FIG. 2. Beverage 51 may be dispensed through inlet hose 502 into the cooling chamber 501. As a result of the temperature difference between beverage 51 when it is dispensed into the cooling chamber 501 and the internal surface of the cooling chamber 501, beverage 51 may start freezing on the inner surface of the cooling chamber 501 and frozen microscopic particles may be created alongside the inner surface of the cooling chamber 501. In accordance with the described embodiment, scraping devices 505 may scrape the inner surface and mix the microscopic particles within the beverage 51. It is noted that many scraping devices may be utilized to scrape the inner surface of the cooling chamber, for example, scraping blades or sweeping devices. The scraping devices 505 may be in a constant motion, e.g., in a cylindric motion around a shaft 510 positioned in the center of the cooling chamber, or in a perpendicular motion along the inner surface of the cooling chamber 501, etc. A motor 520 may be connected to shaft 510 to provide the relative motion between the scraping devices 505 and the inner surface of the cooling chamber 501. Beverage 51 with the frozen microscopic particles mixed in it may be dispensed through outlet hose 503 into a container, e.g., a cup, for serving and consumption (not shown).

Figure 6:
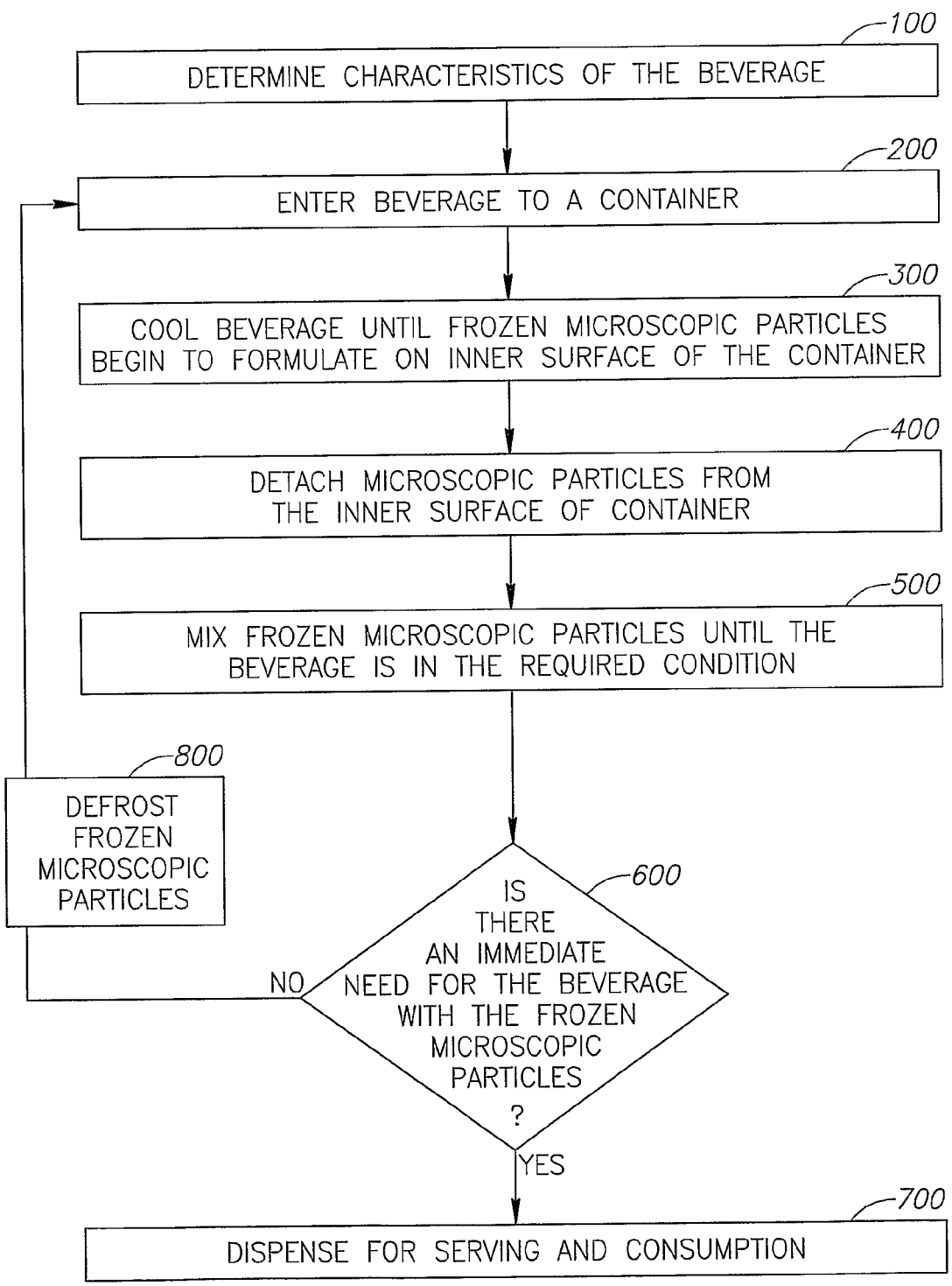
FIG. 6 is a schematic flow chart of a method for beverage forming and dispensing in accordance with some embodiments of the present invention.

Reference is now made to FIG. 6 which is a schematic flow chart of a method for continuous beverage forming and dispensing in accordance with some embodiments of the present invention. Initially, the characteristics of the beverage may be determined (block 100). The characteristics may include, for example, the size of the beverage microscopic particles, the target temperature of the beverage with the beverage microscopic particles, the texture of the beverage (e.g., the distinctive, underlying pattern or structure of the beverage), the volume of the frozen microscopic particles, etc. Thereafter, the beverage may be entered to a container, such as, for example, a heat transfer tube (block 200), and the beverage may be cooled until frozen microscopic particles may begin to formulate on its inner surface (block 300). The frozen microscopic particles may then be scraped from the inner surface of the container (block 400) and mixed with the beverage until the beverage is in the required condition, e.g., reached the predetermined temperature, texture, etc. (block 500). Then, if there is an immediate need for the beverage with the frozen microscopic particles (block 600) the beverage with the frozen microscopic particles may be dispensed to a container for serving and consumption (block 700), or alternatively, the beverage with the frozen microscopic particles may be defrosted (block 800) and then entered to the heat transfer tube (block 200) and so on.

It will be appreciated that the present invention is not limited by what has been described hereinabove and that numerous modifications, all of which fall within the scope of the present invention, exist. For example, while the present invention has been described with respect to the use of blades to scrape the microscopic particles from the surface of the heat transfer tube, other components may be used to release the microscopic particles from their formation surface.

It will be appreciated by persons skilled in the art that the present invention is not limited by what has been particularly shown and described herein above. Rather the scope of the invention is defined by the claims which follow:

The invention claimed is:

1. A beverage forming apparatus comprising:
a container to contain a beverage;
a cooling medium to cool said beverage to a predetermined temperature;
a detaching device to scrape frozen particles of said beverage from an inner surface of said container; and
a motor to provide relative motion between said container and detaching device,
wherein the detaching device is to touch the inner surface of said container, in a rotating motion, in order to scrape the frozen particles of said beverage from said inner surface;
wherein the beverage having the frozen particles is routed in a substantially circular continuous motion to: (a) a continuously-operating non-bursting defrosting unit to continuously defrost the frozen particles passing through the defrosting unit, in order to restore the beverage to its original texture; and then to (b) said cooling medium to cool the beverage and to form said frozen particles of said beverage; and then repeating step (a) and step (b) in said substantially circular continuous motion;
wherein, upon dispensing of said beverage through a tap, said beverage having the frozen particles is routed to said tap in a route which passes at said cooling medium and avoids said defrosting unit.

2. The beverage forming apparatus according to claim 1, further comprising an insulator to insulate said beverage forming apparatus.

3. The beverage forming apparatus according to claim 2, further comprising a cover.

4. The beverage forming apparatus according to claim 1, wherein said detaching device comprises a scraping blade.

5. The beverage forming apparatus according to claim 1, wherein said detaching device comprises a sweeping device.

6. The beverage forming apparatus according to claim 4, wherein said scraping blade is connected to a shaft positioned in the center of said container.

7. The beverage forming apparatus according to claim 6, wherein said shaft is capable of rotating said scraping device in a plurality of speeds.

8. The beverage forming apparatus according to claim 7, wherein the size of said frozen particles of said beverage is determined by a selected speed of rotation of said scraping blade.

9. The beverage forming apparatus according to claim 1, wherein the size of said frozen particles of said beverage is determined by varying the temperature of said cooling medium.

10. The beverage forming apparatus according to claim 1, wherein the size of substantially each one of said particles of frozen beverage is not greater than 30 microns.

11. A cooling method comprising:
providing a beverage into a container;
cooling said beverage to substantially a freezing temperature of said beverage;
detaching microscopic particles of frozen beverage from an inner surface of said container;
mixing said microscopic particles of frozen beverage with said beverage; and
dispensing said beverage with said microscopic particles, wherein the detaching comprises a detaching process with touches the inner surface of said container, in a rotating motion, in order to scrape the frozen particles of said beverage from said inner surface;

wherein prior to said dispensing, the beverage having the frozen particles is routed in a substantially circular continuous motion to: (a) a continuously-operating non-bursting defrosting unit to continuously defrost the frozen particles passing through the defrosting unit, in order to restore the beverage to its original texture; and then to (b) said cooling medium to cool the beverage and to form said frozen particles of said beverage; and then repeating step (a) and step (b) in said substantially circular continuous motion:

wherein, upon dispensing of said beverage through a tap, said beverage having the frozen particles is routed to said tap in a route which passes at said cooling medium and avoids said defrosting unit.

12. The method of claim 11, further comprising, prior to said step of dispensing said beverage:
defrosting said beverage with said microscopic particles; and
repeating the steps of cooling, detaching, and mixing.

13. The method of claim 11, wherein said step of cooling comprises:
determining the size of said microscopic particles of frozen beverage.

14. The method of claim 11, further comprising:
determining the size of said microscopic particles of frozen beverage.

15. The method of claim 11, further comprising:
determining a target temperature of said beverage.

16. The method of claim 11, further comprising:
determining a texture of the beverage.

17. The method of claim 11, further comprising:
determining a volume of said microscopic particles of frozen beverage in said beverage.

18. The method of claim 11, wherein said step of detaching comprises:
scraping said microscopic particles of frozen beverage with a blade.

19. The method of claim 18, wherein said step of detaching comprises:
operating a motor to provide relative movement between said container and said blade.

20. A beverage forming and dispensing system comprising:
an inlet hose to dispense a beverage into said system;
a beverage forming apparatus to form said beverage with frozen microscopic particles of said beverage;
a tap to dispense said beverage with said frozen microscopic particles of said beverage to a container; and
a defrost apparatus to defrost said frozen microscopic particles of said beverage,
wherein the beverage forming apparatus comprises a detaching device to touch the inner surface of a container of said beverage, in a rotating motion, in order to scrape the frozen microscopic particles of said beverage from said inner surface;
wherein the beverage having the frozen particles is routed in a substantially circular continuous motion to: (a) a continuously-operating non-bursting defrosting unit of said defrost apparatus to continuously defrost the frozen particles passing through the defrosting unit, in order to restore the beverage to its original texture; and then to (b) said cooling medium to cool the beverage and to form said microscopic frozen particles of said beverage; and then repeating step (a) and step (b) in said substantially circular continuous motion;
wherein, upon dispensing of said beverage through said tap, said beverage having the frozen particles is routed to said tap in a route which passes at said cooling medium and avoids said defrosting unit.

21. The beverage forming and dispensing system of claim 20, wherein said beverage is directed to said defrost apparatus when said tap is closed.

22. The beverage forming and dispensing system of claim 20, wherein said beverage forming apparatus comprises:
a container to contain said beverage;
a scraping device to scrape frozen particles of said beverage from an inner surface of said container;
a cooling medium to cool said beverage to a predetermined temperature; and
a motor to provide a relative motion between said container and scraping device.

* * * * *